United States Patent [19]

Pierce

[11] 4,212,581
[45] Jul. 15, 1980

[54] REAR BUMPER ROLLING LOADER

[76] Inventor: Leslie C. Pierce, 2418 Wildwood Dr., Woodward, Okla. 73801

[21] Appl. No.: 926,996

[22] Filed: Jul. 21, 1978

[51] Int. Cl.² ............................................. B60P 1/52
[52] U.S. Cl. ..................................... 414/529; 193/37; 414/559
[58] Field of Search .................. 193/37; 414/529–536, 414/462, 559

[56] References Cited

U.S. PATENT DOCUMENTS

| 1,160,592 | 11/1915 | Goldman | 193/37 |
| 1,580,367 | 4/1926 | Beulke | 193/37 |
| 2,079,790 | 5/1937 | Colorigh | 193/37 X |
| 2,551,074 | 5/1951 | Walford | 414/529 |
| 2,859,887 | 11/1958 | Haight | 414/462 |
| 2,958,432 | 11/1960 | Milhem | 414/529 |
| 3,900,118 | 8/1975 | Kellogg | 193/37 X |
| 3,961,715 | 6/1976 | Ellen | 414/534 |

Primary Examiner—L. J. Paperner
Attorney, Agent, or Firm—Snider, Sterne & Saidman

[57] ABSTRACT

A rolling loader designed particularly to be mounted on the rear bumper of a pickup truck for facilitating the loading of heavy objects onto and off of the bed of the truck. The loader includes a heavy, steel pipe having a pair of ball bearing assemblies fitted within each end thereof. A pair of L-shaped brackets have their horizontal plates fastened to the top surface of the bumper. A solid shaft is secured to the vertical plate of each bracket and extends through a central aperture formed in each ball bearing assembly so as to define a horizontal axis for the tube. The brackets are mounted to the bumper so that the rear most and top most portions of the tube extend respectively beyond the rear edge of the bumper and the level of the bed of the truck.

5 Claims, 4 Drawing Figures

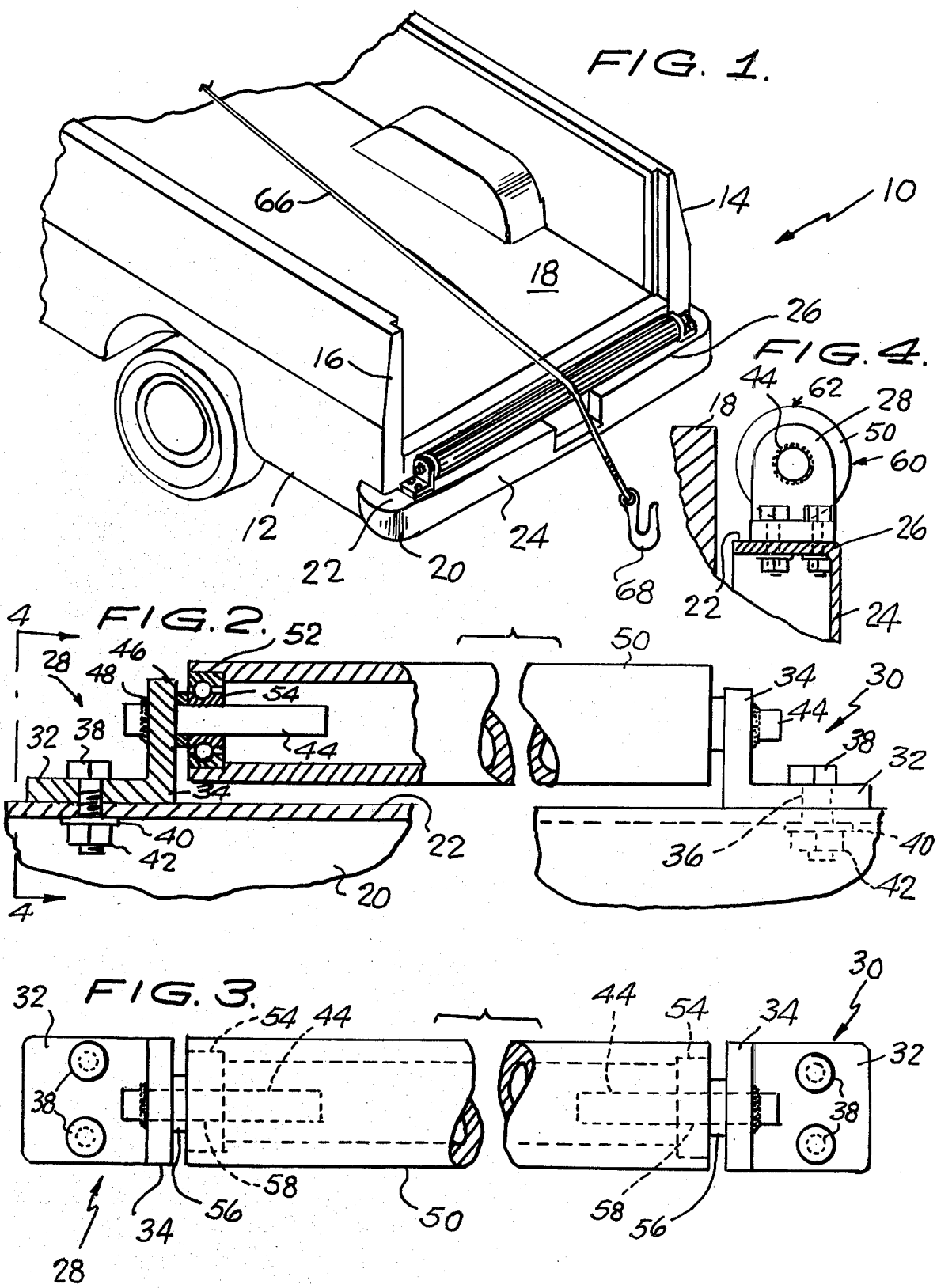

REAR BUMPER ROLLING LOADER

BACKGROUND OF THE INVENTION

1. Field of the Invention

The present invention is related to pickup trucks and, more particularly, is directed towards an accessory for mounting to the rear bumper of a pickup truck which greatly facilitates the loading and unloading of heavy objects.

2. Description of the Prior Art

I am aware of several prior art United States patents which broadly disclose the utilization of some type of roller means with a vehicle. Those U.S. patents of which I am aware include: U.S. Pat. Nos. 2,079,790; 2,859,887; 2,958,432; 3,900,118; and 3,961,715.

While the patents set forth above teach a variety of structures, none, in my opinion, solves the problem of providing a strong, sturdy, easy to use roller-style loader for a pickup truck which may be easily installed on any pickup truck bumper and which does not require modification of the truck in any manner.

Most of the structures described in the prior art patents enumerated above also suffer from the deficiency that they are unable to handle particularly heavy loads, for example in the one to two ton category.

It is towards solving these common problems of the prior art that the present invention is advanced.

OBJECTS AND SUMMARY OF THE INVENTION

It is therefore a primary object of the present invention to provide a rolling loader for a pickup truck which overcomes all of the disadvantages noted above with respect to the prior art devices.

Another object of the present invention is to provide a rolling loader for a pickup truck which is particularly designed to be easily mounted on the rear bumper of the pickup truck.

An additional object of the present invention is to provide a rolling loader for a pickup truck which is sturdy, easy to construct, simple to install, and is capable of handling extremely heavy loads.

The foregoing and other objects are attained in accordance with one aspect of the present invention through the provision of a rolling loader adapted to be mounted to the rear bumper of a pickup truck, which comprises first and second L-shaped brackets each including a horizontal plate adapted to be bolted to the top surface of the rear bumper of the pickup truck, and a vertical plate having a circular aperture formed therein. The loader further includes a heavy, steel tube having first and second ends positioned between the first and second brackets, and first and second ball bearing assemblies fitted respectively within the first and second ends of the tube, each of the ball bearing assemblies including a central aperture formed therein. Further provided are first and second solid shafts that extend through the circular apertures of the first and second brackets, respectively, and through the central apertures of the first and second ball bearing assemblies, respectively. The first and second shafts are fastened to the vertical plates of the first and second brackets, respectively, so as to define a horizontal rotational axis for the tube.

In accordance with more specific aspects of the present invention, the rear bumper includes a rear surface which extends downwardly from the top surface, the junction of the top surface and the rear surface defining a rear edge of the bumper. The tube and brackets are fastened on the bumper so that the rear most portion of the tube extends beyond the rear edge. The pickup includes a substantially horizontal bed which is positioned above the rear bumper, and the uppermost portion of the tube is designed to extend above the level of the bed.

In accordance with yet other aspects of the present invention, the first and second shafts are respectively welded to the vertical plates of the first and second brackets about the circular apertures thereof. The present invention further preferably comprises a washer interposed between each of the first and second ball bearing assemblies and the vertical plates of the first and second brackets. The first and second ends of the tube each preferably include reduced diameter, machined out portions for receiving the first and second ball bearing assemblies therein.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a rear, perspective view of a preferred embodiment of the present invention as mounted on the rear bumper of a pickup truck;

FIG. 2 is a rear view, in elevation, partly in section and part broken, of the preferred embodiment of the present invention illustrated in FIG. 1;

FIG. 3 is a top view, partly broken, of the preferred embodiment of the present invention illustrated in FIG. 1; and FIG. 4 is an end view, partly in section, of the preferred embodiment illustrated in FIG. 2 and taken along line 4—4 thereof.

DETAILED DESCRIPTION OF THE PREFERRED EMBODIMENT

Referring now to the drawings, wherein like reference numerals represent identical or corresponding parts throughout the several views, and more particularly to FIG. 1 thereof, the rolling loader of the present invention is indicated generally by reference numeral 10.

The rolling loader 10 is illustrated in FIG. 1 in its preferred mounting on the rear bumper 20 of a pickup truck 12. Pickup truck 12 includes conventional side walls 14 and 16 which define a substantially horizontal, flat bed 18 therebetween.

The rear bumper 20 of pickup 12 includes an upper, substantially horizontal surface 22 and a rear, substantially vertical surface 24. The junction of upper surface 22 and rear surface 24 defines a rear edge 26 of the bumper 20.

Referring now to FIGS. 2 and 3, the rolling loader 10 of the present invention is seen to include a pair of L-shaped brackets indicated generally by reference numerals 28 and 30. Each of the brackets 28 and 30 are preferably constructed of half inch thick solid steel. The brackets 28 and 30 each include a horizontal plate 32 from which extends a vertical plate 34. Each of the plates 32 and 34 of each bracket are on the order of six and one half inches square.

The horizontal plate 32 of the brackets 28 and 30 preferably includes a plurality of bolt holes 36 through which bolts 38 may be extended. Like holes are formed through the upper surface 22 of the rear bumper 20, so that bolts 38 may securely fasten the horizontal plates 32 by means of washers 40 and nuts 42.

Each of the vertical plates 34 of brackets 28 and 30 include a circular hole 46 centrally formed therein for receiving a solid shaft 44. Shafts 44 are preferably formed of solid steel and are on the order of six inches long and 1⅛ inches in diameter. The shafts 44 are secured to the vertical plates 34 as by welding 48.

Positioned between each of the brackets 28 and 30 is a heavy, steel tube 50 which is preferably formed of 4½ inch (O.D.) steel pipe and is on the order of four feet long. The tube 50 has a pair of open ends each of which are machined out as at 52 to receive a pair of ball bearing assemblies 54 therein. Each of the ball bearing assemblies 54 includes a central aperture 58 which is adapted to receive the solid shaft 44. Washers 56 may be positioned between the ball bearing assemblies 54 and the vertical plates 34 of the brackets 28 and 30, respectively.

Referring now to FIG. 4, the rolling loader of the present invention is shown mounted on the top surface 22 of the rear bumper 20. To facilitate loading and unloading of objects from the bed 18 of truck 12, it may be appreciated that the rear most portion 60 of the tube 50 is designed to extend beyond the rear edge 26 of bumper 20. In this manner, any objects being loaded by being drawn over tube 50 will not be interfered with by bumper 20.

Also to be noted from FIG. 4 is that the upper most portion 62 of tube 50 extends above the level of the bed 18 of the truck 12. This also facilitates loading and unloading of the truck and obviates the need for auxiliary loading devices, such as ramps, and the like.

Illustrated in FIG. 1 is a cable 66 of a winch (not shown) which terminates in a hook 68. The winch-driven cable 68 may be conveniently utilized in combination with the present invention for hauling heavy objects over tube 50. The construction and mounting of tube 50 to the bumper 20 of the pickup provides a solid, sturdy, easy to install and safe construction which can handle extremely heavy loads without auxiliary equipment. The present invention does not require modification of the pickup truck in any manner, and the safety bumper 20 is still able to serve its primary function.

Obviously, numerous modifications and variations of the present invention will be possible in light of the above teachings. It is therefore to be understood that within the scope of the appended claims, the invention may be practiced otherwise than as specifically described herein.

I claim as my invention:

1. A rolling loader adapted to be mounted to the rear bumper of a pickup truck, which comprises:

first and second L-shaped brackets each including a horizontal plate adapted to be bolted to the top surface of said rear bumper of said pickup truck, and a vertical plate having a circular aperture formed therein;

a heavy, steel tube having first and second ends positioned between said first and second brackets;

first and second ball bearing assemblies fitted respectively within said first and second ends of said tube and each including a central aperture formed therein; and first and second solid shafts extending through said circular apertures of said first and second brackets, respectively, and through said central apertures of said first and second ball bearing assemblies, respectively, said first and second shafts being fastened to said vertical plates of said first and second brackets, respectively, so as to define a horizontal rotational axis for said tube; wherein said rear bumper includes a rear surface extending downwardly from said top surface, the junction of said top surface and said rear surface defining the rear edge of said bumper, said tube and brackets being fastened on said bumper so that the rearmost portion of said tube extends beyond said rear edge.

2. A rolling loader as set forth in claim 1, wherein said first and second shafts are respectively welded to said vertical plates of said first and second brackets about said circular apertures.

3. A rolling loader as set forth in claim 2, further comprising a washer interposed between each of said first and second ball bearing assemblies and said vertical plates of said first and second brackets.

4. A rolling loader as set forth in claim 3, wherein said first and second ends of said tube each include reduced diameter portions for receiving said first and second ball bearing assemblies.

5. A rolling loader as set forth in claim 4, wherein said pickup truck includes a substantially horizontal bed positioned above said rear bumper, said tube and brackets being fastened to said bumper so that the uppermost portion of said tube extends above the level of said bed.

* * * * *